(12) United States Patent
Mejías Cordero et al.

(10) Patent No.: US 12,276,007 B2
(45) Date of Patent: Apr. 15, 2025

(54) PROCESS FOR THE RECOVERY OF ZINC FROM ZINC-BEARING RAW MATERIALS

(71) Applicant: TÉCNICAS REUNIDAS, S.A., Madrid (ES)

(72) Inventors: Ana Belén Mejías Cordero, Madrid (ES); Emilio Pecharroman Mercado, Madrid (ES); Maria Frades Tapia, Madrid (ES); Sergio Sanguilinda Solàn, Madrid (ES)

(73) Assignee: TECNICAS REUNIDAS, S.A., Madrid (ES)

( * ) Notice: Subject to any disclaimer, the term of this patent is extended or adjusted under 35 U.S.C. 154(b) by 434 days.

(21) Appl. No.: 17/716,177

(22) PCT Filed: Oct. 13, 2020

(86) PCT No.: PCT/EP2020/078734
§ 371 (c)(1),
(2) Date: Apr. 8, 2022

(87) PCT Pub. No.: WO2021/074124
PCT Pub. Date: Apr. 22, 2021

(65) Prior Publication Data
US 2023/0094835 A1    Mar. 30, 2023

(30) Foreign Application Priority Data

Oct. 14, 2019  (EP) ..................................... 19382898

(51) Int. Cl.
*C22B 3/26*      (2006.01)
*C22B 3/00*      (2006.01)
(Continued)

(52) U.S. Cl.
CPC ................ *C22B 3/26* (2021.05); *C22B 3/065* (2013.01); *C22B 3/08* (2013.01); *C22B 3/10* (2013.01);
(Continued)

(58) Field of Classification Search
CPC .. C22B 3/26; C22B 3/065; C22B 3/08; C22B 3/10; C22B 3/3846; C22B 3/44; C22B 19/22; C22B 3/06; Y02P 10/20
(Continued)

(56) References Cited

U.S. PATENT DOCUMENTS

| 4,124,462 A | 11/1978 | Reinhardt et al. |
| 4,423,012 A | 12/1983 | Reynolds et al. |

(Continued)

FOREIGN PATENT DOCUMENTS

| CN | 102061382 A | 5/2011 |
| EP | 1 361 296 B1 | 11/2003 |

(Continued)

OTHER PUBLICATIONS

International Search Report issued Dec. 18, 2020 in connection with PCT International Application No. PCT/EP2020/078734.
(Continued)

*Primary Examiner* — Brian D Walck
*Assistant Examiner* — Danielle M. Carda
(74) *Attorney, Agent, or Firm* — Gary J. Gershik

(57) ABSTRACT

The present invention refers to an improved process for recovering zinc from primary and secondary raw materials, said process comprising a first leaching step wherein the ratio between the zinc weight contained in the raw material and the volume of the leaching solution is at least 20 kg zinc per m$^3$ of acid aqueous solution; a neutralization step; and a
(Continued)

solvent extraction stage in the presence of organic extractant, wherein the temperature is maintained from 47 to 52° C.

16 Claims, 4 Drawing Sheets

(51) Int. Cl.
    *C22B 3/06*      (2006.01)
    *C22B 3/08*      (2006.01)
    *C22B 3/10*      (2006.01)
    *C22B 3/38*      (2006.01)
    *C22B 3/44*      (2006.01)

(52) U.S. Cl.
    CPC .............. *C22B 3/3846* (2021.05); *C22B 3/44* (2013.01); *C22B 19/22* (2013.01)

(58) Field of Classification Search
    USPC .......................................................... 75/743
    See application file for complete search history.

(56) References Cited

U.S. PATENT DOCUMENTS

| | | |
|---|---|---|
| 4,778,520 A | 10/1988 | Spink et al. |
| 6,869,520 B1* | 3/2005 | Martin San Lorenzo ................... C22B 3/26 423/101 |
| 2004/0031356 A1* | 2/2004 | Lorenzo ................. C22B 3/384 75/722 |
| 2005/0066773 A1 | 3/2005 | Harlamovs et al. |
| 2013/0220824 A1* | 8/2013 | Masse ..................... C22B 19/22 205/605 |

FOREIGN PATENT DOCUMENTS

| | | |
|---|---|---|
| EP | 1361296 A1 | 11/2003 |
| EP | 3049542 A1 | 8/2016 |
| JP | 2008266774 A | 11/2008 |
| JP | 2009074132 A | 4/2009 |

OTHER PUBLICATIONS

Written Opinion of the International Searching Authority issued Dec. 18, 2020 in connection with PCT International Application No. PCT/EP2020/078734.

European Patent Application Publication No. EP 1361296 A1, published Nov. 12, 2003, Tecnicas Reunidas, S.A. (Exhibit 1).

European Patent Application Publication No. EP 3049542 A1, published Aug. 3, 2016, Técnicas Reunidas, S.A. (Exhibit 2).

Japanese Patent Application Publication No. JP 2008266774A published Nov. 6, 2008, Nikko Kinzoku KK (Exhibit 3); and.

Japanese Patent Application Publication No. JP 2009074132A published Apr. 9, 2009, Dowa Metals and Mining Co., LTD (Exhibit 4).

* cited by examiner

PROCESS FOR THE RECOVERY OF ZINC FROM ZINC-BEARING RAW MATERIALS

CROSS-REFERENCE TO RELATED APPLICATIONS

This application is a § 371 national stage of PCT International Application No. PCT/EP2020/078734, filed Oct. 13, 2020, claiming the benefit of European Provisional application Ser. No. 19/382,898.5, filed Oct. 14, 2019, the entire contents of each of which are hereby incorporated by reference into the subject application.

FIELD OF THE INVENTION

The invention relates to the field of zinc recovery processes, and more particularly to hydrometallurgical treatments using different zinc primary and/or secondary raw materials which allow obtaining electrolytic zinc or high purity zinc compounds.

BACKGROUND

Procedures using various sources of zinc, either primary or secondary, as raw materials have been widely known for decades. Most of them are based on hydrometallurgical treatments whose main purpose is to obtain zinc or salts thereof with a high degree of purity.

A first method involved the roasting of a primary raw material (zinc sulphide concentrate) by which an impure zinc oxide was obtained. It was subsequently subjected to a leaching step with sulfuric acid, thus producing an aqueous zinc-containing solution, still containing a high level of impurities, which was purified by cementation with zinc powder. The purified solution was sent to an electrowinning step in order to produce metallic zinc. However, this method did not provide zinc with high purity, particularly when the raw material contains a high content of Mn, soluble salts of Na, K and Mg, and/or halides, and further different and/or expensive stages were also needed.

Other general procedures also include an acid leaching step of the raw material to dissolve the zinc, but they incorporate a subsequent selective extraction of the zinc by means of an organic acid extractant. The resulting zinc-loaded organic phase is treated to recover zinc in the form of an aqueous solution by a procedure commonly known as stripping.

The first processes based on this technology share, as the main drawback, the provision of zinc with a purity that was far from that required for numerous applications.

This was mainly due to the absence of an adequate purification/washing stage, either of the organic phase obtained after the extraction stage and/or of the aqueous phase generated after the stripping stage.

Document EP1361296 incorporates some improvements to those existing procedures, mainly by introducing a neutralization stage of the pulp or of the solution obtained after the leaching stage, as well as purification stages consisting of successive barriers to impurities. These purification stages are carried out on the zinc-loaded organic phase obtained after extraction and/or on part of the liquid phase resulting from said neutralization stage.

These improvements allowed obtaining zinc with a high degree of purity, being a procedure still used up to date.

Document US2013/0220824 also describes a process to reduce the level of impurities, in particular the presence of antimony, which results difficult to be separated from zinc during the extraction stage with organic extractant. To do this, this process incorporates a first soft leaching, also referred to as neutral leaching, whereby antimony is not solubilized, thus being retained in the solid phase as an impurity, followed by a second leaching under standard acid conditions. However, although this process also reduces the level of chlorides and fluorides by also introducing a pre-washing step of the raw material, it is only limited to the treatment of those raw materials containing antimony in addition to zinc.

Therefore, all the methods mentioned above focus on the search for procedures that allow zinc to be obtained with a higher degree of purity but not so much to improve the zinc extraction yield.

In fact, the above-referred processes are not always satisfactory as the percentage of zinc recovered from the raw material is not as high as desirable from the technical and, mainly, economic point of view.

For all these reasons, there is still a need to develop new procedures or to improve existing ones, so that higher yields can be obtained in the recovery of zinc, while maintaining the level of purity. It would be also desirable that these procedures do not involve a higher cost of the necessary infrastructure in plant to implement them.

BRIEF DESCRIPTION OF THE INVENTION

The authors of the present invention have introduced some improvements in processes to recover ultrapure zinc or zinc-containing compounds already known in the prior art.

Said improvements have allowed increasing the amount of extracted zinc from raw materials. In fact, by the conditions imposed in the new process, the zinc throughput can be increased up to 45%.

Overall, the improvements introduced in the process according to the invention, particularly increasing Zn concentrate and temperature, make also possible to reduce the size of most pieces of equipment needed in a plant, such as, tanks, pumps, mixer vessels, settlers, filters, etc., as well as piping, fittings and instruments.

Another advantage derived from this is that less amount of organic phase is required for the operation. Organic flow rate is lower, so the volume of organic in the pipes, the live volume in the mixer vessels, settlers and tanks is also lower and, hence, the total volume to run the plant is optimized as well as the firefighting package requirements.

Considering similar residence times compared to original processes, the volume and surfaces required for the different units is lower too since the flow rates are also lower, thus contributing to obtain a higher degree of optimization in terms of capital and operating expenditures.

Thus, the present invention relates to a process for the recovery of metal zinc or zinc-containing compounds from a raw material containing zinc, said process comprising:
  a) providing a solid or liquid zinc-bearing raw material containing at least 3 wt % of zinc;
  b) if the zinc-bearing raw material is solid, leaching said solid raw material with an acid aqueous solution having a pH between 0 and 4 to dissolve the zinc contained in the solid raw material, thus obtaining a pulp comprising a leached solution containing the dissolved zinc and a non-leached solid residue;
  wherein the ratio between the zinc weight contained in the solid raw material and the volume of the acid aqueous solution used in this leaching step is at least 20 kg zinc per $m^3$ of acid aqueous solution;

c) optionally, separating the non-leached solid residue from the leached solution containing the dissolved zinc;
d) neutralizing the pulp obtained in step b), or the leached solution if step c) is carried out, or the zinc-bearing raw material when it is liquid, in the presence of a neutralizing agent, thus obtaining a neutralized zinc-rich solution containing solubilized zinc and a solid residue, and separating said zinc-rich solution from the solid residue;
   wherein when the zinc-bearing raw material is liquid, then it contains at least 40 g/L of zinc dissolved therein;
e) solvent extraction of the solubilized zinc contained in the zinc-rich solution with an organic extractant, thus obtaining a zinc-loaded organic liquid phase and an aqueous raffinate containing impurities,
   wherein the weight ratio between quantities in the organic phase and aqueous phase (O/A ratio) ranges between 1.3 and 1.6, and wherein the temperature in this step ranges between 47 and 52° C.;
f) purifying the zinc-loaded organic liquid phase by a method comprising washing and scrubbing said zinc-loaded organic liquid phase while maintaining the temperature between 47 and 52° C.;
g) stripping the zinc loaded in the organic liquid phase with an acid aqueous solution, thus obtaining an acid aqueous solution containing zinc and an organic stream containing impurities;
h) recovering the zinc contained in the acid aqueous solution obtained in step g) by a method selected from electrowinning, crystallization and precipitation, thus obtaining metal zinc or zinc-containing compounds and an acid aqueous solution.

DETAILED DESCRIPTION OF THE INVENTION

The process of the present invention is applicable to the treatment of raw materials containing zinc (also referred to as zinc-bearing raw material). Particularly, said raw material can come from primary or secondary zinc sources, either solids or liquids. Solids include zinc oxide ores, calcines, steel plant dusts, zinc dross, zinc skimmings, mineral carbonates, mineral silicates, sulphates, smelting slag, galvanization residues, dust from arc furnaces, Waelz oxides, chemical precipitates, etc., all containing impurities in variable amounts, such as silicon, aluminium, iron, calcium, magnesium, manganese, sodium, potassium, cooper, antimony, arsenic, cobalt, nickel, cadmium, chlorides, fluorides and other elements and compounds.

The zinc contained in these different solids may range as low as about 3 wt % to as high as about 80 wt %, for example from 10 to 60 wt %.

For liquid raw materials, the zinc ion can be present as sulphate including, unlimited, many and varied quantities of chlorides, nitrates, silicates, etc., not necessarily minorities.

The solid raw materials, before being used as feed according to the process of the invention, may be finely ground until reaching the appropriate particle size, with a maximum size of 2 millimetres.

Figure 1:
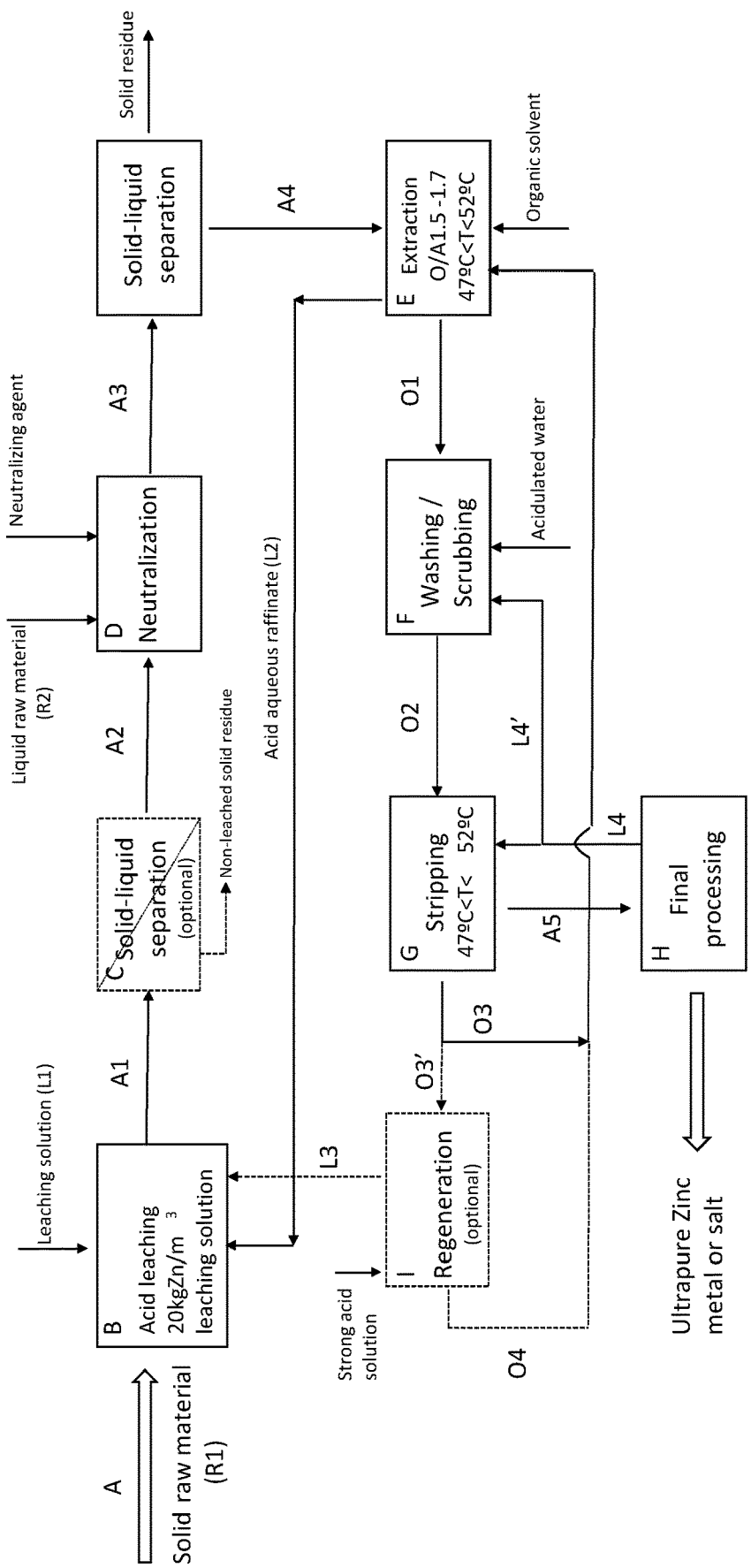
FIG. 1 illustrates a flow chart schematically representing the steps of the process of the invention.

The different steps of the process of the invention are detailed herein below and also they are schematically represented in a flow chart as depicted in FIG. 1.

Leaching Step (Step b)

The first step of the process of the invention only applies when the raw material used as feed is solid, and consists in leaching the zinc-bearing raw material (R1) with an acid aqueous solution (L1, also referred to as aqueous leaching solution).

The aqueous leaching solution (L1) used to leach the zinc contained in the solid raw material (R1) is highly acid, more particularly the leaching with the acid aqueous solution takes place in a pH ranging between 0 and 4, preferably between 0 and 3, more preferably between 1.5 and 2.5.

Under these conditions, the zinc contained in the solid raw material is gradually leached in the form of water-soluble zinc salt, with a yield greater than 80%, preferably greater than 90% based on the zinc present in the solid raw material.

Preferably, the leaching step is carried out under conditions which cause zinc to be dissolved in preference to other metal components. In fact, the leaching step may be carried out under gently temperature, acidity and pressure conditions with the aim of limiting the dissolution of the impurities accompanying the zinc, such as iron, aluminium, silicon.

As a result, an aqueous phase (A1) containing a main fraction of zinc in the form of Zn' is obtained (also referred to as pregnant leached solution), along with a non-leached solid residue containing undissolved elements which can be removed later by a solid liquid-separation step, according to step c) of the process of the invention.

In a particular embodiment, the acid that may constitute the acid aqueous solution (L1) is selected from sulphuric acid, hydrochloric acid, nitric acid, hydrofluoric acid, mixtures thereof and waste acid solutions, provided that the resulting acid aqueous solution has a pH between 0 and 3.

The acid aqueous solution (L1) used in the leaching step is, preferably, an aqueous medium which contains a weight majority of sulphuric acid, optionally in combination with other acids, such as hydrochloric acid. In the specific case where the aqueous leaching solution contains only one acid, this acid is preferably sulphuric acid.

When sulphuric acid is used in the aqueous leaching solution, the zinc contained in the solid raw material is leached in the form of water-soluble zinc sulphate.

Advantageously, the acid aqueous solution used to leach the solid raw material can be a recycled solution resulting from the zinc solvent extraction according to step e) of the process of the invention, i.e., the aqueous raffinate (L2) resulting from step e) which contains at least a strong acid.

In a particular embodiment, the solid zinc-bearing raw material (R1) is leached in the acid aqueous solution at a temperature below 95° C., preferably in the range of from 45° C. to 65° C.

Said first leaching step with the acid aqueous solution takes place preferably with a residence time between 0.5 and 7 h, more preferably between 0.5 and 2 h.

In another particular embodiment, the leaching step of the solid raw material is performed in at least one stirred reactor.

In another particular embodiment, the leaching step of the solid raw material is carried out in a plurality of zones in cascade, the number of zones being at least 2, but preferably from 3 to 5.

The temperature measured in each cascade zone is generally set and maintained at a given value. However, it is possible the leaching temperature to be set at a precise value for each considered zone of the cascade according to an increasing temperature setting scale.

The solid raw material (R1) used as feed should contain at least 20 kg of zinc per m³ of the aqueous leaching solution used in this step b). Preferably, the content of zinc in the solid raw material ranges from 20 to 30 kg, more preferably from 20 to 25 kg per m³ of the aqueous leaching solution.

In terms of feeding rate, this is the same as saying that the zinc should be fed to the leaching step at a rate of at least 20 kg/h per m³/h of the acid aqueous solution fed to this step, irrespective the content of zinc in the solid raw material. Preferably, the zinc is fed at a rate from 20 to 30 kg/h, more preferably from 20 to 25 kg/h per m³/h of the acid aqueous solution.

Thus, if for example the solid raw material contains 80 wt % of zinc, the solid raw material should be fed to the leaching step at a rate of at least 25 kg/h per m³/h of the acid aqueous solution fed to the leaching step. Similarly, if the solid raw material contains 20 wt % of zinc, the solid raw material should be fed to the leaching step at a rate of at least 100 kg/h per m³/h of the acid aqueous solution fed to the leaching step.

This provides a leached solution (A1) containing at least 40 g/L of zinc dissolved therein, in contrast to previous zinc recovery processes wherein only 30 g/L of dissolved zinc were obtained in the leached solution.

This increase of the zinc concentration in the leached solution has been obtained with no side effects that could affect negatively the level of impurities transferred to the subsequent solvent extraction step.

Thus, after the leaching step, it is obtained a zinc-rich solution (A1, pregnant leached solution) comprising higher amounts of dissolved zinc, as well as a non-leached solid residue containing some impurities.

Solid-Liquid Separation Step (Step c)

Optionally, in step c) of the process of the invention, a solid-liquid separation treatment may be carried out in order to separate the pregnant leached solution (A1) containing dissolved zinc from the non-leached solid residue. Said separation treatment may be done by any method known by those skilled in the art, such as physical separation treatments.

After separation of the undissolved residue from the pregnant leached solution, said pregnant leached solution (A2) is brought to neutralization step d), whereas the non-leached solid residue can be evaluated by undergoing further treatment or simply separated from the stream at this stage without further treatment.

Neutralization Step (Step d)

The zinc loaded in the pregnant leached solution exits the leaching area as pulp (A1), or as a solution (A2) if it undergoes the aforementioned solid-liquid separation step. Said leached solution, as pulp or as solution, and containing solubilized impurities, undergoes a treatment consisting of a controlled neutralization step. Said neutralization treatment is performed at a pH compatible with the precipitation of each impurity, mainly constituted by silicon, iron, aluminium, antimony and arsenic.

When the zinc-bearing raw material is liquid (R2), this is first subjected to this neutralization step without being necessary previous treatments, i.e., the leaching step b).

In this particular case, the liquid zinc-bearing raw material should contain at least 40 g/L of zinc dissolved therein. Preferably, the liquid zinc-bearing raw material should contain from 40 to 100 g/L of zinc dissolved therein.

Said neutralization, either over the leached solutions or over the liquid raw material, is carried out in the presence of a neutralizing agent.

The neutralizing agent may be any typical alkaline agent, such as hydroxides, raw material, carbonates, bicarbonates, in particular, calcium carbonates or hydroxides and, more particularly, chalk or lime.

The neutralization step is carried out at a temperature close to that reached in the leaching step, i.e., at a temperature below 95° C., more preferably from 40 to 60° C. The residence time is of the same order of magnitude as in the leaching step, i.e., between 0.5 and 7 hours, preferably between 1 and 4 hours. At the end of the neutralization step, the pH of the neutralized leached solution is brought to a value between 3 and 5, preferably between 3.5 and 4.3.

Depending on the characteristics of the raw material and plant capacity, the neutralization treatment can be carried out in several stages in cascade.

When the neutralization is carried out in several steps, the final pH post-neutralization can evolve in a controlled manner until reaching the value set for the different steps in order to selectively precipitate the impurities.

In a particular embodiment, and also depending on the characteristics of the raw material (such as Zn oxides, hydroxides and urban waste incineration residues), the leaching step and the neutralization step can be carried out simultaneously in only one step. In this particular embodiment, the pH is controlled so as to be 4.

Having concluded the neutralization, a solid-liquid separation can take place, allowing the separation of the neutralized zinc-rich solution (A3) from the solid residue containing the precipitated impurities which is further removed.

Once separated, the neutralized zinc-rich solution (A4) is partially or totally sent to the solvent extraction step, said step being detailed below.

Solvent Extraction Step (Step e)

The neutralized zinc-rich solution (A4) obtained after conducting the neutralization step d), and subsequent separation, is partially or totally then subjected to a liquid-liquid extraction step in order to further reduce the content of other metal impurities present therein, thus contributing to obtain zinc with higher purity.

This step includes the extraction of zinc by putting in contact the neutralized zinc-rich solution (A4) obtained in step d) with an organic extractant, preferably under counter-current conditions.

During this step, zinc is selectively and gradually loaded into the organic liquid phase, releasing H⁺ ions according to the following chemical reaction:

$$Zn^{2+} + 2HR \rightarrow ZnR_2 + 2H^+$$

wherein HR represents the organic acid extractant and $ZnR_2$ refers to the zinc-loaded organic solution containing the extracted zinc.

The zinc-rich solution fed to the extraction step has a pH higher than 2, preferably between 3.5 and 4.5. However, during the zinc extraction, the obtained aqueous solution increases its acidity to between 0.01 and 3.0 g/l of equivalent H⁺. This occurs because the protons are transferred from the organic phase to the aqueous phase throughout the extraction step according to the above reaction. An alkaline agent can be added to slightly increase the pH.

To attain the best selective extraction, acid conditions are used so that, only those cations having greater affinity for the acid organic extractant, such as iron and zinc, can be extracted. Under these acid conditions, there is an increase in selectivity against other cation impurities.

Therefore, an organic extraction phase (O1) containing dissolved zinc is obtained along with an acid aqueous phase (L2) containing impurities (also referred to as aqueous raffinate). The aqueous solution (L2) that exists the extraction area has acidity equivalent to that of the extracted zinc and this acidity is used in the leaching step. Actually, the increase of zinc concentration in both the aqueous and organic solution means that the aqueous raffinate that leaves the extraction step and goes back to the leaching area has a higher acidity, thus reducing the addition of the acid therein.

In particular, during this extraction step wherein the zinc-rich solution (A4) comes into contact with the organic extractant, zinc is extracted releasing $H^+$ ions, more particularly two $H^+$ ions per each retained $Zn^{2+}$ ion. The acid aqueous solution (L2) produced in the extraction step and still containing residual zinc and a significant quantity of dissolved impurities can be, totally or partially, but always mostly, recycled to step b) as a leaching solution to leach the solid raw material.

This extraction step may be advantageously performed in several stages, for example said extraction step is repeated up to three times.

The organic extractant is preferably selected from alkyl phosphoric acids, alkyl phosphonic acids, alkyl phosphinic acids and mixtures thereof, more preferably the organic extractant is selected form the group consisting of di-(2-ethylhexyl) phosphoric acid (also referred as to D2EPHA), di-(2-etylhexyl) phosphonic acid and di-(2,4,4-trimethylpentyl) phosphinic acid.

For its use in zinc extraction, the organic extractant is preferably dissolved in an organic compound or in a mixture of organic compounds originating from an oil moiety, such as $C_{11}$-$C_{14}$ paraffins and naphthalenes, e.g., kerosene. The weight proportion of the organic extractant in the organic compound ranges between 5 and 75%, and preferably between 30 and 50 wt %.

In a particular embodiment, said organic extractant can also be used without being dissolved in any other organic compound.

The volumetric ratio between quantities in the organic phase and aqueous phase at the extraction step (O/A ratio) is selected so as to obtain as much extracted zinc as possible in the organic phase. Namely, the volumetric O/A ratio ranges between 1.3 and 1.6. A O/A ratio within said range provides a zinc-loaded organic phase containing around 18-20 g/L of zinc dissolved therein, in comparison with previous zinc extraction processes where only 13-14 g/L of zinc are obtained. Preferably, the volumetric O/A ratio ranges from 1.4 to 1.6.

In fact, the use of at least 20 kg of zinc per $m^3$ of aqueous leaching solution or a zinc feeding rate of at least 20 kg/h per $m^3$/h of aqueous leaching solution, along with a O/A ratio between 1.3 and 1.6 in the extraction step, are the key factors that allow increasing overall zinc recovery. Accordingly, by the new conditions imposed in the process to recover zinc, the zinc throughput can be increased from 30 to 45%.

Furthermore, in order to meet the conditions and improvements described above, and due to the higher concentration of zinc in the organic phase, the temperature should be increased throughout the whole extraction step.

Typically, in previous processes, the temperature in all solvent extraction steps is around 40° C. This ensures the zinc loading as well as the physical properties of the organic phase to be good enough to produce a loaded electrolyte with the quality required in the final step (electrowinning step).

However, in the process according to the present invention, the temperature in the extraction step should be from 47° C. to 52° C., more preferably around 50° C. Lower temperatures are not enough to properly reduce the viscosity of the organic phase, whereas higher temperatures would involve higher costs derived from required heating/cooling processes.

Overall, the improvements introduced in the process according to the invention, particularly increasing Zn concentration and temperature, make also possible to reduce the size of most pieces of equipment needed in a plant, such as, tanks, reactors, pumps, mixer vessels, settlers, filters, etc., as well as piping, fittings and instruments.

Another advantage derived from this is that less amount of organic phase is required for the operation. Organic flow rate is lower, so the volume of organic in the pipes, the live volume in the mixer vessels, settlers and tanks is also lower and, hence, the total volume to run the plant is optimized as well as the firefighting package requirements.

Considering similar residence times compared to original processes, the volume and surfaces required for the different units is lower too since the flow rates are also lower, thus contributing to obtain a higher degree of optimization in terms of capital and operating expenditures.

Thus, after conducting the extraction step, a zinc-loaded organic phase (O1) is formed containing a higher concentration of zinc dissolved therein, as well as an acid aqueous extraction phase (L2, aqueous raffinate), which may be recycled into the leaching step of the process of the invention.

Purification Step (Step f)

The zinc-loaded organic solution (O1) resulting from the extraction step e) still contains co-extracted entrained impurities, but in small quantities, and it is sent to step f) for further purification.

These remaining impurities in the organic phase (O1) may be removed in order to avoid contamination of the final product (zinc or zinc-containing compound) resulting from the process according to the present invention, which must be extremely pure. This is the reason as to why the zinc-loaded organic solution undergoes a purification treatment to remove all traces of remaining impurities still present.

The purification step comprises washing and scrubbing the zinc-loaded organic phase (O1) with an aqueous acid solution. This allows removing impurities which, at concentration of ppm or ppb, can be co-extracted or entrained in the zinc-loaded organic phase that exists the extraction step.

In a particular embodiment, the purification step includes an array of counter-current stages, more particularly comprises at least one physical treatment and at least one chemical treatment.

The physical treatment of the zinc-loaded organic phase (also referred to as washing step) is made to avoid aqueous entrainment in the organic phase and is achieved by adding acidulated water, with an acidity range between 0.01 and 4 g/l of equivalent $H^+$. The volumetric organic/aqueous ratio ranges from 5 to 100, preferably from 15 to 25. This physical treatment can be performed several times, preferably up to four times.

The chemical treatment (also referred to as scrubbing step) is carried out by using an acidified recycled solution (mainly containing dissolved zinc) coming from the acid aqueous phase (L4') originated in the final step of the process of the invention. This solution has between 10 g/l and 100 g/l of zinc and between 0.1 and 5 g/l of equivalent $H^+$.

This treatment is based on the displacement of the co-extracted impurities to the aqueous phase by additional zinc extraction, achieving an organic solution (O2) of pure zinc according to the following equilibrium reaction:

$$MeR_n + Zn^{2+} \rightarrow ZnR_2 + Me^{n+}$$

where $Me^{n+}$ is the metallic impurity cation, being n the valence thereof.

This scrubbing step can also be performed several times, preferably up to four times.

The temperature of both, physical and chemical treatments, should be maintained in the range 47-52° C., preferably at 50° C., as in the extraction step.

The combination of physical and chemical treatment provides a zinc-loaded organic phase (O2) with extremely high purity levels.

Stripping Step (Step g)

The cleaned zinc-loaded organic phase (O2) obtained after the purification step is subjected to a stripping step consisting in the treatment of said cleaned organic phase with an acid aqueous solution according to the following chemical reaction:

$$ZnR_2 + 2H^+ \rightarrow 2HR + Zn^{2+}$$

The conditions at the stripping step allow impurities such as iron and aluminium, extracted with the zinc at the extraction step, not to be stripped from the organic phase, thus only the zinc is stripped and, therefore, a purified aqueous solution (A5) of zinc is obtained along with an organic stream (O3) containing said impurities.

In a particular embodiment, the acid aqueous solution used in the stripping step is an acidified recycled solution coming from the acid aqueous phase (L4) originated in the final step of the process of the invention, or at least a partial stream thereof.

The acidity of the acid solution used in the stripping step is between 0.5 and 5.5 g/l of equivalent $H^+$, and contains between 0 and 250 g/l of zinc.

As mentioned above, and under these conditions, cations such as iron and aluminium which are also extracted by the organic solution together with zinc cations, are not as easily stripped as the zinc cations, and therefore they remain in the organic phase (O3) after the stripping step and do not contaminate the resulting purified aqueous solution (A5). However, in order to prevent their accumulation, the process of the invention may further comprise sending a bleed (O3') of the organic stream (O3) originated at the stripping step to a regeneration step. The bleed (O3') that is sent to said regeneration step represents, at most 20% of the total volume of the organic stream (O3) and, preferably, between 1 and 5% volume.

In this regeneration step, the bleed (O3') is treated with a strong acid solution, preferably with a hydrochloric acid solution, having an acidity between 2 and 10 mol/l, preferably between 4 and 8 mol/l, to strip those ions and regenerate the organic solution maintaining suitable quality and purity levels therein. The organic bleed (O4), already regenerated, can be recycled to the extraction step e) or to the depletion step described below, if applies, and the depleted acid (L3) can be sent to the leaching step b) or to an acid recovery system.

The remaining organic stream (O3) that has not been sent to the regeneration step is partially or totally recycled to be used at the extraction step e) and, if applies, at the depletion step described below.

More particularly, a mixture containing the organic bleed (O4) resulting from the regenerating step and the organic solution (O3) resulting from the stripping step are recycled to the extraction step and, if applies, to the depletion step described below.

In a variant of the process, the total organic stream (O3) originated at the stripping step is made to pass through regeneration before being recycled to extraction and, if applies, depletion.

In another particular embodiment, the aqueous raffinate (L2) resulting from the extraction step and the depleted acid (L3) from regeneration step are passed through an active charcoal column in order to remove the organic content entrained by these streams, thus minimizing organic losses. This treatment can be considered an additional purification step, preventing the organic contamination of all aqueous solutions in general, but more particularly the pure stripped aqueous acid solution.

Recovery of Zinc (Step h)

The zinc-containing purified aqueous solution (A5) originated in the stripping step is fed to the last step of the process of the invention in order to recover ultra-pure zinc.

The ultra-pure zinc can be recovered according to a process selected from electrowinning, crystallization, precipitation and combinations thereof. However, other known processes to produce zinc compounds can also be used.

In a particular embodiment, the recovery of zinc is made by electrowinning. By means of this process, a zinc purity higher than 99.995% is obtained, thus producing the best quality classification of the London Metal Exchange following the maximum quality standards.

Once the zinc has been recovered, a highly acidic aqueous solution (L4) remains which can be recycled to be used in other steps of the process of the invention. Thus, in a particular embodiment, the acid aqueous solution (L4) resulting from this last step can be fed to the stripping area in order to provide the required acidity to strip the zinc from the organic phase.

Also in a particular embodiment, a small stream (L4') of said acid aqueous solution (L4) is sent to the washing/scrubbing steps to maintain the excellent quality of that aqueous stream acting as a purification system. This allows the supply of an ultra-pure aqueous acid solution, completely free of impurities, to the washing/scrubbing steps, thus contributing to assure an extremely low impurity level required, acting as a medium for the extreme purification of the zinc-loaded organic phase. Therefore, the total purity in the stripping step is maintained and it can be considered a useful tool to prevent external contamination at the final zinc production step.

Further Purification Treatment

Figure 2:
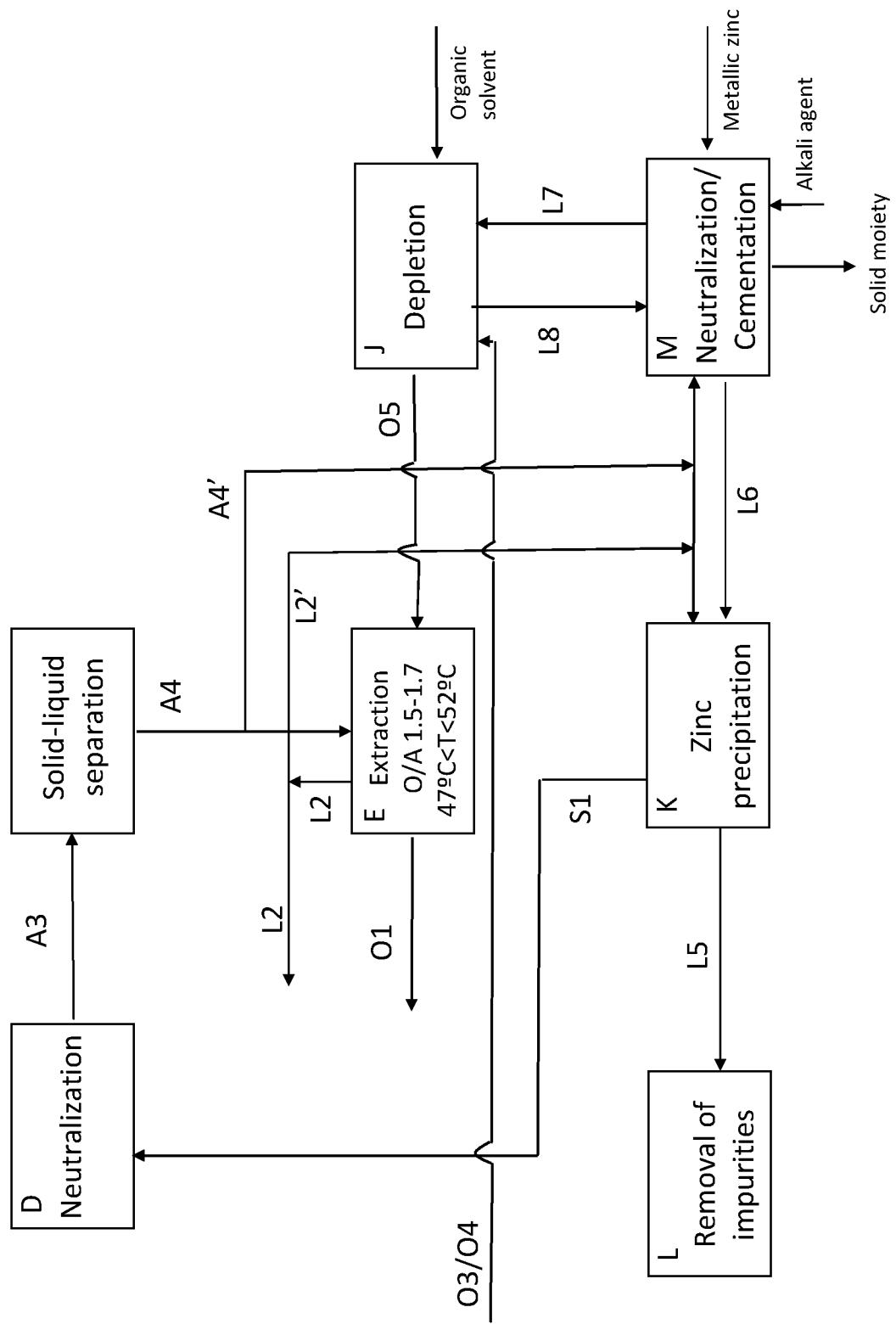
FIG. 2 illustrates a flow chart of the further purification treatment.

The different steps of this further purification treatment are detailed herein below and also they are schematically represented in a flow chart as depicted in FIG. 2.

In order to further increase the zinc recovery efficiency, the process of the invention can also include a further purification treatment using a small part of the neutralized zinc-rich aqueous solution (A4'), prior to extraction step e), and/or of the aqueous raffinate (L2') produced after said extraction step. This treatment allows the removal of water and prevents the accumulation of different soluble impurities such as sodium, potassium, chlorides, fluorides, magnesium, cooper, nickel, cobalt and cadmium resulting from the different interrelated steps of the process, by checking and removing them.

The small part of the neutralized zinc-rich aqueous solution (A4'), and/or of the aqueous raffinate (L2') produced after said extraction step, which are separated from the main stream and subjected to this further purification treatment, represent a maximum of 25% of the volume of the total stream, and preferably from 8 to 15% in volume.

In a first particular embodiment, this further purification treatment comprises subjecting part of the neutralized zinc-rich aqueous solution (A4'), and/or of the aqueous raffinate (L2'), to a precipitation step by a controlled neutralization so as zinc is precipitated from the solution, followed by a solid-liquid separation. The resulting zinc-rich solid moiety (S1) is then recycled to the neutralization step d), whereas the resulting liquid moiety (L5) can undergo an impurity removal step by controlled neutralization.

Said precipitation can be conducted in the presence of an alkaline agent at a pH from 6 to 8 and at a temperature between 70 and 90° C.

In a second particular embodiment, the further purification treatment comprises:
  subjecting part of the neutralized zinc-rich aqueous solution (A4'), and/or of the aqueous raffinate (L2'), to a cementation step, thus producing a liquid stream (L6) containing dissolved zinc and a solid moiety containing metal impurities;
  subjecting the liquid stream (L6) containing dissolved zinc to a precipitation step to obtain a zinc-rich solid moiety (S1) which is recycled to the neutralization step c).

By the cementation step, the part of the neutralized zinc-rich aqueous solution (A4'), and/or of the aqueous raffinate (L2') is first treated with an alkali agent controlling the pH so as to be maintained between 2 and 4, followed by addition of metallic zinc powder while maintaining the temperature between 20 and 90° C. Said metallic zinc displaces solubilized metal impurities and therefore, triggers the precipitation of the metal impurities such as cooper, cadmium, cobalt and nickel which are separated and removed.

As a result, a liquid stream (L6) containing dissolved zinc is produced and separated from the precipitated metal impurities, which is then subjected to the precipitation step as that described in the first particular embodiment mentioned above. The resulting zinc-rich solid moiety (S1) produced after said precipitation step is also recycled to the neutralization step d), whereas the resulting liquid moiety (L5) can undergo an impurity removal step by controlled neutralization.

In a third particular embodiment, the further purification treatment comprises:
  subjecting part of the neutralized zinc-rich aqueous solution (A4'), and/or of the aqueous raffinate (L2'), to the cementation step, thus producing a liquid stream (L7) containing dissolved zinc and a solid moiety containing metal impurities;
  subjecting the resulting liquid stream (L7) containing dissolved zinc to a depletion step by putting in contact said liquid stream (L7) with an organic extractant, thus producing a zinc-loaded organic solution (O5), which is recycled to the extraction step e), and a depleted aqueous solution (L8);
  subjecting the depleted aqueous solution (L8) to a cementation step, thus producing a liquid stream (L6) still containing dissolved zinc and a solid moiety containing metal impurities;
  subjecting the liquid stream (L6) to a precipitation step to obtain a zinc-rich solid moiety (S1) which is recycled to the neutralization step d).

The cementation step in this third particular embodiment is the same as that described in the second particular embodiment above.

The liquid stream (L7) resulting from the cementation step and containing dissolved zinc, is put in contact with an organic extractant in order to extract the zinc present in said liquid stream. The organic extractant used can be any of those mentioned for the solvent extraction step d). Additionally, or alternatively, the organic extractant may be a recycled organic extractant (O3) coming from the organic stream originated in the stripping step and/or from the organic stream (O4) obtained in the regeneration step if conducted. The resulting organic phase (O5) containing the extracted zinc is sent to the solvent extraction step e), whereas the depleted aqueous solution (L8) is recycled to the cementation step.

The resulting liquid stream (L6) originated after the cementation step is sent to the precipitation step where it follows the same procedure as that defined in the first particular embodiment above.

In a fourth particular embodiment, the further purification treatment combines the treatment of the first particular embodiment with one of the two between the second and the third embodiment. In this case, the further purification treatment comprises in a first variant:
  dividing the part of the neutralized zinc-rich aqueous solution, and/or of the aqueous raffinate, into a first and a second bleed;
  subjecting the first bleed to a precipitation step to obtain a zinc-rich solid moiety which is recycled to the neutralization step d);
  subjecting the second bleed to a cementation step, thus producing a liquid stream containing dissolved zinc and a solid moiety containing metal impurities; and
  subjecting the liquid stream containing dissolved zinc to a precipitation step to obtain a zinc-rich solid moiety which is recycled to the neutralization step d).

In this particular fourth embodiment, the further purification treatment comprises in a second variant:
  dividing the part of the neutralized zinc-rich aqueous solution, and/or of the aqueous raffinate, into a first and a second bleed;
  subjecting the first bleed to a precipitation step to obtain a zinc-rich solid moiety which is recycled to the neutralization step d);
  subjecting the second bleed to a cementation step, thus producing a liquid stream containing dissolved zinc and a solid moiety containing metal impurities;
  subjecting the resulting liquid stream containing dissolved zinc to a depletion step by putting in contact said liquid stream with an organic extractant, thus producing a zinc-loaded organic solution, which is recycled to the extraction step e), and a depleted aqueous solution;
  subjecting the depleted aqueous solution to a cementation step, thus producing a liquid stream still containing dissolved zinc and a solid moiety containing metal impurities; and
  subjecting the liquid stream still containing dissolved zinc to a precipitation step to obtain a zinc-rich solid moiety which is recycled to the neutralization step d).

After the zinc recovery following the different steps mentioned above, the liquid streams (L5) resulting from the zinc precipitation step, from the cementation step and, optionally from the depletion step, can be sent to an impurity removal stage by controlled neutralization. More particularly, they can be treated with an alkaline agent at a pH between 8 and 12, and subsequently, the obtained solid precipitate is separated at a temperature between 30 and 90° C. Most of the liquid produced therefrom could be recycled to the main circuit of the process of the invention as a base for the preparation of reagents or as process water. The remaining liquid, if any, can be evacuated as final effluent.

The solid residue containing the precipitate of metal impurities and resulting from the cementation step is removed from the process or undergoes its own elimination treatment.

All steps described in the above particular embodiments of the further purification treatment can be applied either, for the neutralized zinc-rich aqueous solution (A4) obtained after conducting step d) of the process of the invention, and/or for the aqueous raffinate (L2) resulting from the extraction step e) of the process of the invention.

Both solutions can be treated individually or in combination. In both cases, through the recycling of the zinc-rich solid moiety (S1) to the neutralization step d) according to any of the particular embodiments mentioned above, the total zinc recovery is increased.

Example 1. Recovery of Ultra-Pure Zinc According to the Process of the Invention Invention will be much better understood by means of an example in which improved process according to the invention is described and results compared to former process as defined in EP1361296. FIGS. 1 and 2 also serve as support to understand the different steps and streams resulted from the process described in this example, wherein all the operating units are represented by capital letters.

This example refers to Special High Grade zinc production from secondary Zn bearing materials, using the following operation units:

Raw material leaching transferring Zn from solid to liquid state

Extraction of Zn from aqueous solution to an organic extractant (D2EHPA)

Zn stripping from extractant using an acidic treatment, so the organic solution can be recycled back to extraction SHG Zn production implementing a Zn electrowinning or crystallization unit The solid raw material (R1) used as feed contained 20 wt % of zinc. The main impurities present in the solid raw material were mainly Si, Al, Fe, Ca, Mg, Mn, Cl, Cu, Cd, Ni, F and K.

Firstly, the raw material was ground until 100% was under 1.3 mm and prepared in pulp form, and then was fed to the leaching area (B). Namely, 10.5 tonnes/h of said solid material was added as leaching feedstock to the leaching area (B). The leaching of the solid raw material was conducted through a series of reactors disposed in cascade arrangement. Each leaching reactor was provided with a stirrer. The leaching area (B) was also fed at the same time with 100 m³/h of leaching solution. Said leaching solution contained sulfuric acid (L1) and aqueous raffinate (L2) coming from the extraction area (E).

The average leaching pH in the reactors was maintained at a value of 2.5, whereas the temperature was set at a constant value of about 50° C., having been the time necessary for the raw material to reach the optimum yield 2 h.

The resulting leached pulp (A1) leaving the leaching area (B) was then fed directly to the neutralization step (D) without being subjected to solid-liquid separation.

The leached pulp (A1) was neutralized in 4 neutralization reactors simultaneously adding chalk, so that the average pH was set at a value of 4.2. The temperature was kept at a maximum of 50° C. between the first and neutralization last reactor. The time required to precipitate some of the critical impurities that come along with the feed material was 2 h.

The pulp (A3) leaving the neutralisation area (D) was flowed to a series of thickeners, which were provided with raking mechanisms. Underflow was sent to a filtration package that produced a cake that can be treated under a processes such as that defined in EP3049542 (also referred to as ECOLEAD process) to obtain, for example, a saleable silver-lead concentrate.

The clarified liquid (unfiltered pregnant leached solution, also referred to as PLS) from the thickeners was collected in tanks and pumped through polishing filtration equipment to remove traces of suspended solids that would affect the process downstream.

The polished neutralized leached solution (A4) was fed to a heat exchanger to reach the operating temperature (50° C.) required for the extraction step at extraction area (E). The leached solution (A4) was treated in several extraction stages within mixer vessels.

Within each mixer vessel, the organic extractant D2EHPA and the aqueous solution (A4) in a ratio of 1.46 were thoroughly mixed to promote mass transfer and achieve chemical equilibrium. The mixed phases then passed to the associated settler where they disengaged and flew away as separate streams. This hydro-dynamic process was identical in every mixer-settler within the solvent extraction area (E). The outlet streams were an acidic aqueous zinc raffinate (L2) and a 20 g/L zinc-loaded organic phase (O1).

The flow pattern of aqueous phase (A4) and organic phase (D2EHPA) along this unit was counter-current: the neutralized pregnant leached solution was fed to the extraction stage mixer vessel where it was contacted with the organic phase, which entered into the first extraction stage mixer vessel from an organic storage tank.

The aqueous phase (L2) leaving the extraction stages flowed to a buffer tank from where it was pumped through active carbon filters to remove the last traces of organic entrainment.

Filtered zinc raffinate was collected and stored in a raffinate tank, and was finally recycled, back to the leaching unit (B), closing a process loop.

A small bleed (L2') (see FIG. 2) was used to balance water and impurities. This bleed was treated by means of conventional neutralization treatment steps downstream at area (M), that allowed recovering Zn and produced a suitable solution (L6) that was subjected to a precipitation step at area (K). The solid zinc (S1) formed after said precipitation step was recycled to the neutralization area (D), whereas the solid for after the neutralization at area (M) was rejected according to environmental regulations.

The zinc-loaded organic phase (O1) resulting from the extraction area (E) flowed into the subsequent washing/scrubbing unit (F) that mainly consisted of a series of mixer-settlers, each one comprising different agitated mixers in series and a settler.

In this unit, zinc-loaded organic phase (O1) was contacted with demineralised water and spent electrolyte (L4') coming from the final processing area (electrowinning area) (H). Spent electrolyte from electrowinning and demin water were fed to a washing mixer vessel.

In the washing/scrubbing unit (F), the physical and chemical washing process removed co-extracted impurities from the zinc loaded organic phase (O1), as well as impurities present in the aqueous entrainment.

The spent washing liquor leaving the washing stages was returned to extraction stages, to recover the zinc contained in it.

The washed zinc-loaded organic phase (O2) flowed into the stripping unit (G). No intermediate pumps or storage tanks were required in the washing unit.

The washed organic phase (O2) was counter-currently contacted with spent electrolyte (L4). The net result of the stripping unit (G) was the selective transfer of zinc from the zinc-loaded organic phase (O2) to the spent electrolyte (L4), which becomes a zinc-loaded electrolyte (A5), and the corresponding transfer of the acidity in the opposite way.

The stripped organic phase (O3) with low zinc content, left the stripping stage (G) and flowed to the organic tank, closing the organic phase circuit in the process.

A small continuous stream (O3', around 3%) was taken from the organic tank, to be treated at rrganic regeneration unit (I), wherein the organic regenerated phase (O4) was led to the extractions rea (E).

Loaded electrolyte, an ultra-pure zinc solution (A5), was collected and last traces of organic entrainment were removed. Loaded electrolyte from the stripping step was perfectly suitable to produce Special High Grade zinc plates through electrowinning or ultra-pure zinc salt through crystallization technique.

Figure 3:
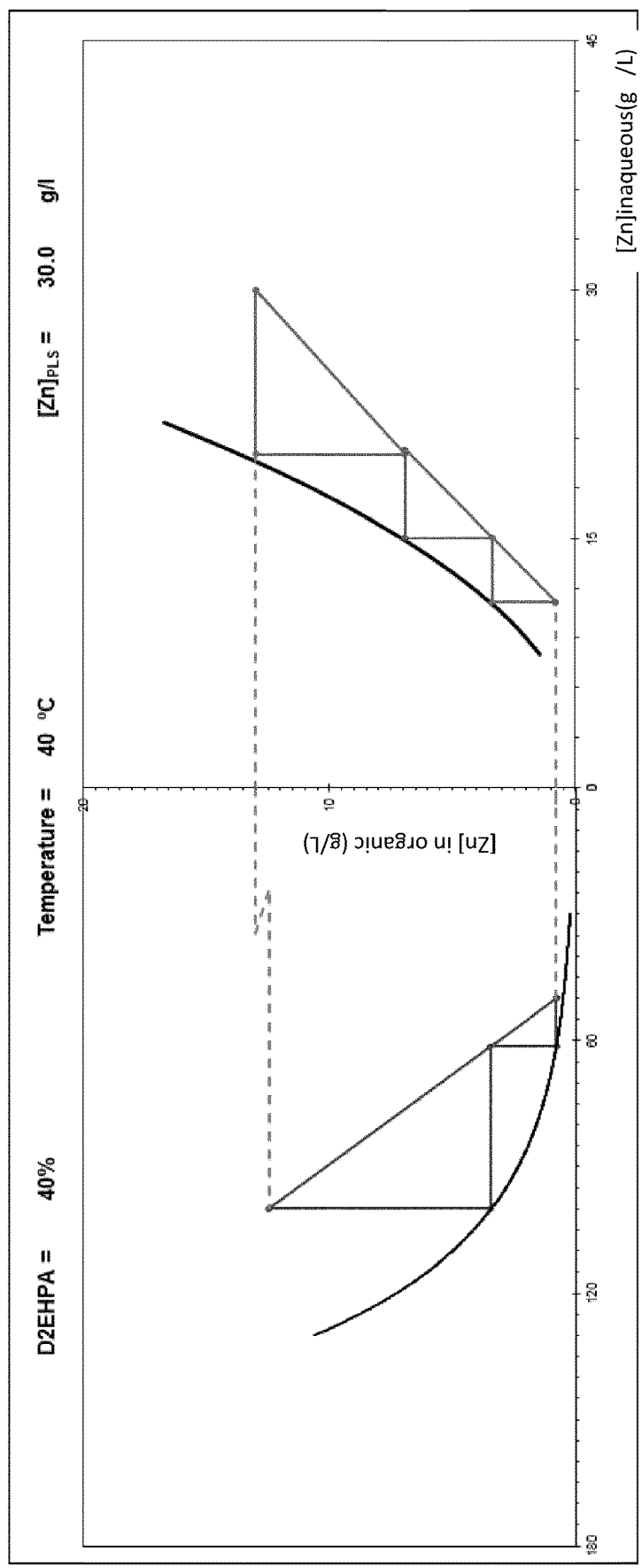
FIG. 3. Widget diagrams corresponding to former process conditions (prior art).
Figure 4:
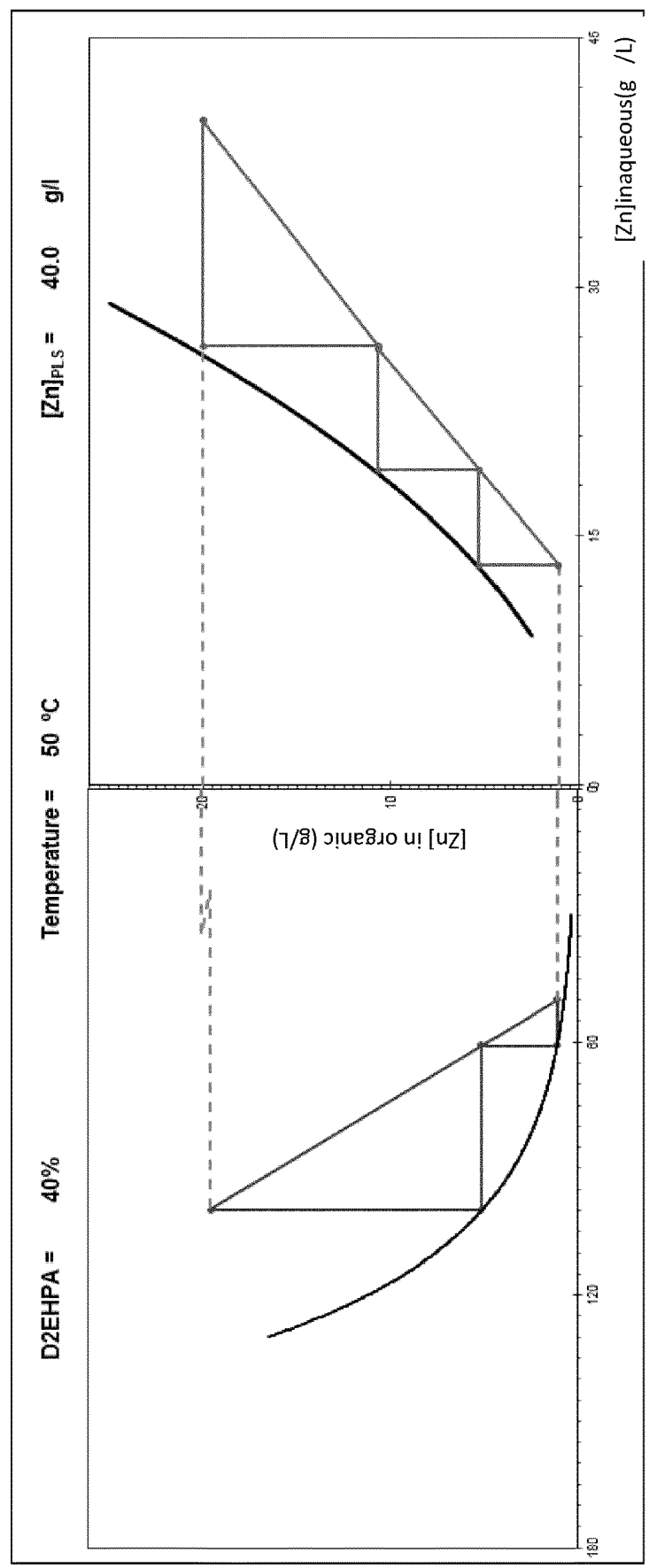
FIG. 4. McCabe Thiele diagrams corresponding to a process according to the present invention

Next tables show the comparison between former process and improved process according to the invention. FIGS. 3 and 4 reflect McCabe Thiele diagrams that support indicated improvement.

TABLE 1

Process conditions comparison.

| Parameter | Former process | Improved process |
|---|---|---|
| Raw material feeding rate | 7.6 t/h | 10.5 t/h |
| wt % of zinc in the raw material | 20% | 20% |
| Zinc feeding rate | 1.52 t/h | 2.1 t/h |
| Zn concentration in PLS | 30 g/L | 40 g/L |
| Extraction temperature | 40° C. | 50° C. |
| Extraction O/A ratio | 1.65 | 1.46 |
| Zinc concentration in organic phase | 13 g/L | 20 g/L |

TABLE 2

Outputs comparison between former and improved conditions.

| Parameter | Former process | Improved process | Comparison |
|---|---|---|---|
| Leaching solution Flowrate | 100 m³/h | 100 m3/h | Calculation basis |
| Organic Flowrate | 165 m³/h | 146 m³/h | −12% |
| Zn extraction efficiency | 63% | 67% | +4% |
| Overall Zn production | 15.900 t/a | 22.400 t/a | +41% |

The invention claimed is:

1. A process for the recovery of metal zinc or zinc-containing compounds from a raw material containing zinc, said process comprising:
   a) providing a solid or liquid zinc-bearing raw material containing at least 3 wt % of zinc;
   b) if the zinc-bearing raw material is solid, leaching said solid raw material with an acid aqueous solution having a pH between 0 and 4 to dissolve the zinc contained in the solid raw material, thus obtaining a pulp comprising a leached solution containing the dissolved zinc and a non-leached solid residue;
      wherein the ratio between the zinc weight contained in the solid raw material and the volume of the acid aqueous solution used in this leaching step is at least 20 kg zinc per m³ of acid aqueous solution;
   c) optionally, separating the non-leached solid residue from the leached solution containing the dissolved zinc;
   d) neutralizing the pulp obtained in step b), or the leached solution if step c) is carried out, or the zinc-bearing raw material when it is liquid, in the presence of a neutralizing agent, thus obtaining a neutralized zinc-rich solution containing solubilized zinc and a solid residue, and separating said zinc-rich solution from the solid residue;
      wherein when the zinc-bearing raw material is liquid, then it contains at least 40 g/L of zinc dissolved therein;
   e) solvent extraction of the solubilized zinc contained in the zinc-rich solution with an organic extractant, thus obtaining a zinc-loaded organic liquid phase and an aqueous raffinate containing impurities,
      wherein the weight ratio between quantities in the organic phase and aqueous phase (O/A ratio) ranges between 1.3 and 1.6, and wherein the temperature in this step ranges between 47 and 52° C.;
   f) purifying the zinc-loaded organic liquid phase by a method comprising washing and scrubbing said zinc-loaded organic liquid phase while maintaining the temperature between 47 and 52° C.;
   g) stripping the zinc loaded in the organic liquid phase with an acid aqueous solution, thus obtaining an acid aqueous solution containing zinc and an organic stream containing impurities;
   h) recovering the zinc contained in the acid aqueous solution obtained in step g) by a method selected from electrowinning, crystallization and precipitation, thus obtaining metal zinc or zinc-containing compounds and an acid aqueous solution.

2. The process according to claim 1, wherein the ratio between the zinc weight contained in the solid raw material and the volume of the acid aqueous solution used in this leaching step ranges from 20 to 30 kg zinc per m³ of acid aqueous solution.

3. The process according to claim 1, wherein the zinc-bearing raw material contains between 3 and 80 wt % of zinc based on the total weight of the zinc-bearing raw material.

4. The process according to claim 1, wherein the acid aqueous solution used in step b) is selected from sulfuric acid, hydrochloric acid, nitric acid, hydrofluoric acid and mixtures thereof.

5. The process according to claim 1, wherein the pH of the acid aqueous solution used in step b) is between 1.5 and 2.5.

6. The process according to claim 1, wherein the temperature in the leaching step b) ranges from 45 to 65° C.

7. The process according to claim 1, wherein the neutralizing agent used in step d) is selected from hydroxides, carbonates and bicarbonates.

8. The process according to claim 1, wherein the organic extractant used in the extraction step e) is alkyl phosphoric acids, alkyl phosphonic acids, alkyl phosphinic acids and mixtures thereof.

9. The process according to claim 1, wherein the temperature in the extraction step e) is 50° C.

10. The process according to claim 1, wherein in the purification step f), the washing of the zinc-loaded organic liquid phase is conducted with an acidulated water having an acidity between 0.01 and 4 g/l of equivalent $H^+$, being the volumetric organic/aqueous ratio from 5 to 100.

11. The process according to claim 1, wherein in the purification step f), the scrubbing of the zinc-loaded organic liquid phase is conducted with an acidified recycled solution coming from the acid aqueous solution originated in step h).

12. The process according to claim 1, wherein the acidity of the acid aqueous solution used in the stripping step is between 0.5 and 5.5 g/l of equivalent $H^+$ and the temperature of this step is maintained between 47 and 52° C.

13. The process according to claim 1, further comprising subjecting a bleed of the organic stream originated at the stripping step g) to a regeneration step by treating said bleed with an acid having an acidity between 2 and 10 mol/l, thus resulting a regenerated organic phase which is recycled to the extraction step e) and a depleted acid solution which is recycled to the leaching step b).

14. The process according to claim 1, further comprising subjecting part of the neutralized zinc-rich aqueous solution obtained in step d), and/or of the aqueous raffinate obtained in step e), to a precipitation step in the presence of an alkaline agent at a pH between 6 and 8 and at a temperature between 7° and 90° C., thus resulting a zinc-rich solid moiety which is recycled to the neutralization step d).

15. The process according to claim 1, further comprising:
-subjecting part of the neutralized zinc-rich aqueous solution obtained in step d), and/or of the aqueous raffinate obtained in step e), to a cementation step by first treating said solution and/or raffinate with an alkali agent at a pH between 2 and 4, followed by addition of metallic zinc powder while maintaining the temperature between 2° and 90° C.; thus producing a liquid stream containing dissolved zinc and a solid moiety containing metal impurities;

subjecting the liquid stream containing dissolved zinc to a precipitation step in the presence of an alkaline agent at a pH between 6 and 8 and at a temperature between 7° and 90° C., to obtain a zinc-rich solid moiety which is recycled to the neutralization step d).

16. The process according to claim 1, further comprising:
subjecting part of the neutralized zinc-rich aqueous solution obtained in step d), and/or of the aqueous raffinate obtained in step e), to a cementation step by first treating said solution and/or raffinate with an alkali agent at a pH between 2 and 4, followed by addition of metallic zinc powder while maintaining the temperature between 2° and 90° C., thus producing a liquid stream containing dissolved zinc and a solid moiety containing metal impurities;

subjecting the resulting liquid stream containing dissolved zinc to a depletion step by putting in contact said liquid stream with an organic extractant, thus producing a zinc-loaded organic solution, which is recycled to the extraction step e), and a depleted aqueous solution;

subjecting the depleted aqueous solution to another cementation step by first treating said solution and/or raffinate with an alkali agent at a pH between 2 and 4, followed by addition of metallic zinc powder while maintaining the temperature between 2° and 90° C., thus producing a liquid stream still containing dissolved zinc and a solid moiety containing metal impurities;

subjecting the liquid stream still containing dissolved zinc to a precipitation step in the presence of an alkaline agent at a pH between 6 and 8 and at a temperature between 7° and 90° C., to obtain a zinc-rich solid moiety which is recycled to the neutralization step d).

* * * * *